(12) United States Patent
Lamoureux et al.

(10) Patent No.: US 6,330,458 B1
(45) Date of Patent: Dec. 11, 2001

(54) INTELLIGENT ANTENNA SUB-SECTOR SWITCHING FOR TIME SLOTTED SYSTEMS

(75) Inventors: Philip Lamoureux, Succasunna; Alex Matusevich, Morris Plains; Myles Patrick Murphy, Annandale; Max Aaron Solondz, Morris Township Morris County; Norman Gerard Ziesse, Chester, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/144,312

(22) Filed: Aug. 31, 1998

(51) Int. Cl.[7] .................................................. H04B 1/38
(52) U.S. Cl. ...................... 455/561; 455/562; 455/277.1; 375/334; 375/347
(58) Field of Search .............................. 455/277.2, 273, 455/561, 277.1, 101, 562; 375/334, 347, 442, 321, 326, 337; 370/458, 508

(56) References Cited

U.S. PATENT DOCUMENTS

| | | | | |
|---|---|---|---|---|
| 5,097,484 | * | 3/1992 | Akaiwa | 375/267 |
| 5,361,404 | * | 11/1994 | Dent | 455/135 |
| 5,369,801 | * | 11/1994 | Smith | 455/277.1 |
| 5,446,922 | * | 8/1995 | Siwiak et al. | 455/277.2 |
| 5,724,666 | * | 3/1998 | Dent | 455/562 |
| 5,781,592 | * | 7/1998 | Masuda | 455/133 |
| 6,032,033 | * | 2/2000 | Morris et al. | 455/277.2 |

FOREIGN PATENT DOCUMENTS

| | | | | |
|---|---|---|---|---|
| 4421643 A | 1/1996 | (DE) | .............................. | H04B/7/04 |
| 0722234 A | 7/1996 | (EP) | .............................. | H04L/1/060 |
| 10135886 | * | 5/1998 | (JP) | .............................. H04B/7/06 |

OTHER PUBLICATIONS

Translation of DE 4421643 A, Jan. 1996, DEX.

* cited by examiner

Primary Examiner—Nay Maung
Assistant Examiner—Sonny Trinh
(74) Attorney, Agent, or Firm—Irena Lager

(57) ABSTRACT

A time slotted system capable of switching between two or more antennas during the guard times of the time slots. Switching between antennas during the guard time of the time slots eliminates any disturbance to the user, since it eliminates any loud noise, or popping that can occur during the switching between antennas. The beamwidth of each of the antennas is narrower than needed to cover a sector of a cell of the system, increasing the size of the cell due to the larger gain of the narrower beamwidth antenna elements. The system also includes a scanning radio for determining the optimal signal amongst the signals received on the antennas, and a switch for coupling the antenna receiving the optimal signal to a receiver system. In one embodiment of the invention the optimal signal is based on the information content of the signal, such as the signal's bit error rate. In another embodiment of the invention, the optimal antenna is selected, and a plurality of a combined signals is obtained by combining the signal received on the optimal antenna and a signal received on one of the other antennas, until all of the antennas have been paired with the optimal antenna. The optimal combined signal is selected, and the antenna pair that received the signals that produced the optimal combined signal are coupled to the receiver system.

13 Claims, 8 Drawing Sheets

INTELLIGENT ANTENNA SUB-SECTOR SWITCHING FOR TIME SLOTTED SYSTEMS

FIELD OF THE INVENTION

This invention is related to antenna systems, and more particularly to a time slotted system having sub sectors and sub sector antennas.

BACKGROUND OF THE INVENTION

Referring to FIG. 1, the geographic area serviced by a wireless telecommunications system 100 is divided into a plurality of spatially distinct areas called "cells." For ease of analysis each cell 102, 104, 106 is typically approximated and schematically represented by a hexagon in a honeycomb pattern, however, each cell is actually of an irregular shape that depends on the topography of the terrain surrounding the cell. Each cell 102, 104, 106 contains one base station 112, 114, 116, respectively. Each of base stations 112, 114, 116 includes equipment to communicate with Mobile Switching Center ("MSC") 120, which is connected to local and/or long-distance transmission network 122, such as a public switch telephone network (PSTN). Each base station 112, 114, 116 also includes radios and antennas that the base station uses to communicate over an air interface with wireless terminals 124, 126. The air interface may be an air interface for digital signals such as TDMA, GSM, or CDMA, or it may be an analog air interface.

One example of a time slotted air interface is a time division multiple access system, such as North American TDMA or GSM systems. In a Frequency Division Duplex (FDD) system using a time slotted air interface, the radio spectrum is divided into two bands. Half the spectrum is used for uplink, the transmission of signals from the mobile unit the base station, and half the spectrum is used for downlink, the transmission of signals from the base station to the mobile unit. The two bands are further broken down into individual channels. For TDMA each channel is 30 kHz, and for GSM each channel is 200 kHz.

In typical North American TDMA system, each time slot has a duration of 6.67 milli seconds (ms), six time slots comprise a frame. Each time slot includes a preamble, an information message, and tail bits. The time slots cycle after every third time slot. An uplink signal from a mobile unit is only received by the base station during the user's designated time slots, and a downlink signal from the base station to a mobile unit is only transmitted during the user's designated time slots. For example, signals from user one are in the first time slot, signals from user two are in the following time slot, signals from user three are in the third time slot.

Separate transmit and receive antennas are often used at the base station to transmit and receive signals over the air interface, although a common single antenna and a means of separating the transmitted signal from the received signal can also be used. The receive antennas at the base station can be omni-directional antennas that cover the entire cell or directional antennas that cover one sector of one of the cells. Cells 102, 104, 106 can be sectored into six 60° geographical sectors each having directional antennas that cover the individual sectors or three 120° geographical sectors each having directional antenna that cover the individual sectors.

The size of cells 102, 104, 106 in wireless communication system 100 is determined by a number of factors, including the gain of the base station's receive antenna, the gain of the mobile terminals' antennas, the transmitter power of the base station, the transmitter power of the mobile terminals, the base station's receiver sensitivity, the mobile unit's receiver sensitivity, and height of the base stations antenna (s). In many wireless communication systems, the limiting factor on cell size is the uplink range, which is dependent on the transmitter power of the mobile terminal. Under most circumstances, base stations 112, 114, 116 have enough power to increase the downlink range by increasing the transmitter power if signals are too weak to reliably reach users at the outermost edge of the sectors. However, if the uplink signals from the mobile terminal are too weak to reliably reach the base station, the mobile terminal may not have the capacity to increase its transmission power, limiting the useable range, and therefore the size of the cell to the distance from which the signal from the mobile terminal can reliably reach the base station.

Smaller cell size requires additional cells in order to be able to provide coverage over the entire area serviced by wireless telecommunications system 100. Additional cells require the purchase, installation and maintenance of more equipment, as well as increased requirements and costs of site acquisition for the base stations, interconnection facilities, and system support.

Higher gain narrower beam receive antennas at each base station reduce interference by eliminating reception of signals outside the sub-sector. Higher gain narrower beam transmit antennas reduce interference since signals transmitted outside the sub-sector are not received at full strength within the sub-sector.

Higher gain receive antennas at each base station also permit reliable reception of uplink signals at greater distances. Because gain is inversely related to antenna beamwidth, higher gain is possible by the use of narrow beamwidth antennas providing coverage over only a portion of a sector. One proposal for implementing a system with narrow beamwidth antennas providing coverage over only a portion of a sector is to use a multi-beam antenna with a plurality of antenna beams that are narrower than the sector and collectively cover an entire sector. The signals are received on the antenna beams, and one antenna beam is selected to be connected to the receiver based on the amplitude and/or signal to spurious signal ratio of the signal on that antenna beam. The systems continues monitoring the sector and when the amplitude and/or signal to spurious signal ratio of the uplink signal received on another antenna beam is larger than the current antenna connected to the receiver, the system switches to the better performing antenna beam.

A problem with such a system is that when the system switches the antennas connected to the receiver there is a discontinuity in the signal. In an analog system, the discontinuity in the signal is manifested as a loud noise, or as it is known in the industry a pop. This loud noise can last as long as a second and is uncomfortable for the user. The noise both disturbs the user's conversation, making it a distraction and annoyance, and it is physically uncomfortable to the user, since it is loud and unpleasant.

In a digital system, the discontinuity in the signal results in bit error rates, and the loss of synchronization, and a disturbance of the automatic gain control (AGC). This is typically manifested in either a noise or a muting of the signal. Both of which are a distraction and annoyance to the user.

SUMMARY OF THE INVENTION

The invention solves the above problems by synchronizing the switching between antenna elements with the time slots of a time slotted communication system. Preferably the switching between antenna elements occurs during the guard times of the time slots. This eliminates any disturbance to the user, since switching between antenna elements during the guard time of a time slot eliminates any discontinuity in the signal that can result in bit errors and/or noise that can occur during the antenna switching. The system includes two or more sub-sector antenna elements with beamwidths narrower than needed to cover a sector of a cell. The narrower beamwidth of the antenna elements reduces interference and increases the range of the cell due to the larger gain of the narrower beamwidth antenna elements. The plurality of sub-sector antennas allows for the same total angular coverage as a sectored system.

In operation, a scanning radio analyzes the signals received on each of the antenna elements and determines the optimal signal. The antenna element receiving the optimal signal is then coupled to the receiver during the guard time of a time slot. In one embodiment of the invention, the optimal signal is based on the information content of the signal, such as the signal's bit error rate.

This invention also solves the problem of optimization reception, in another embodiment of the invention. The optimal signal is selected based on the performance of antenna sets. The optimal antenna element is selected, and signal sets are formed using the signal received on the optimal antenna and one of the other antennas. The signal sets are compared to select the optimal signal set, and the optimal signal set is provided to two or more diversity receivers.

BRIEF DESCRIPTION OF THE DRAWINGS

It should be noted that the Figures are drawn to best illustrate preferred embodiments of the invention and are not drawn to scale.

DETAILED DESCRIPTION

Figure 1:
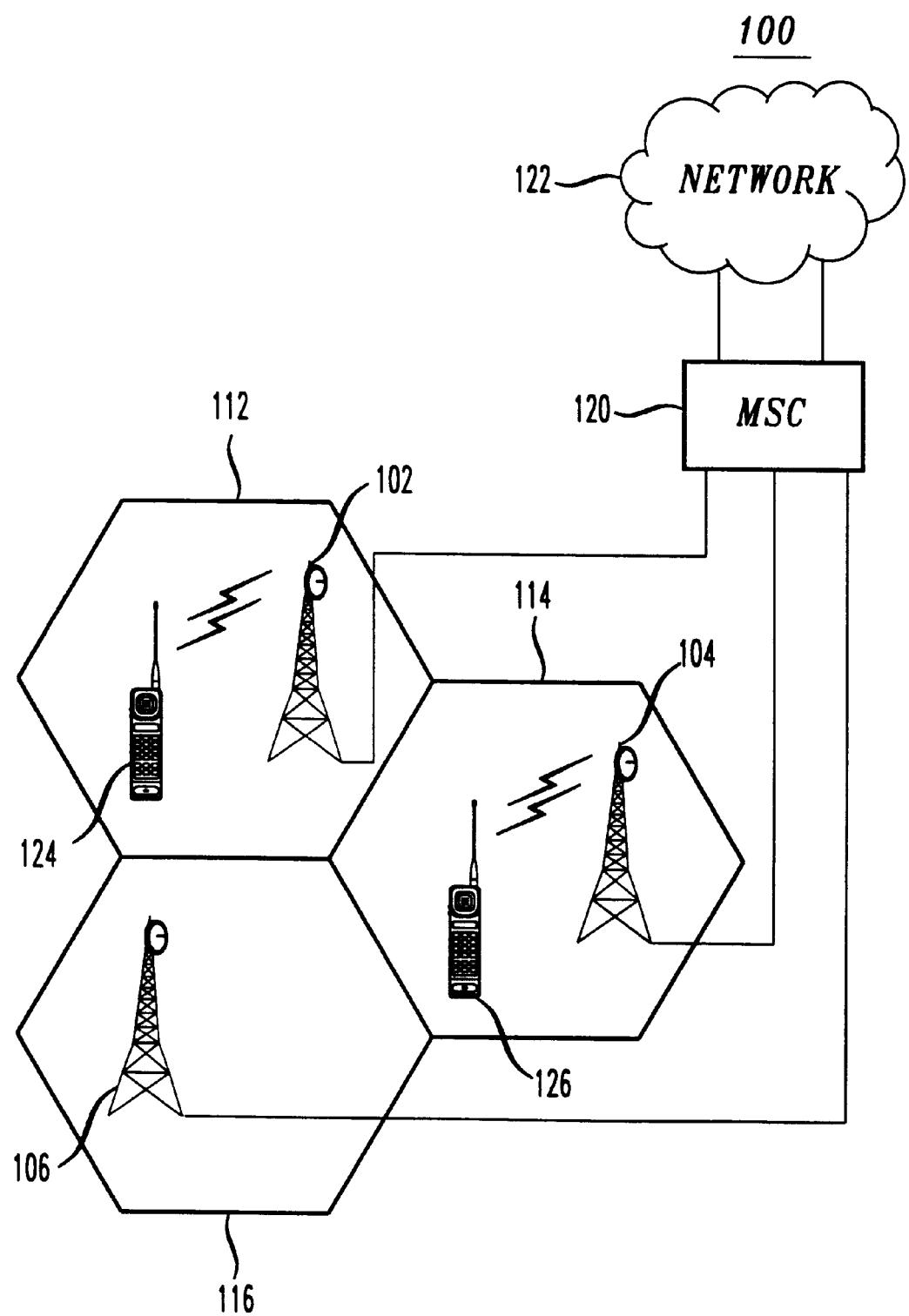
FIG. 1 is a block diagram of a portion of a wireless telecommunication system.
Figure 2:
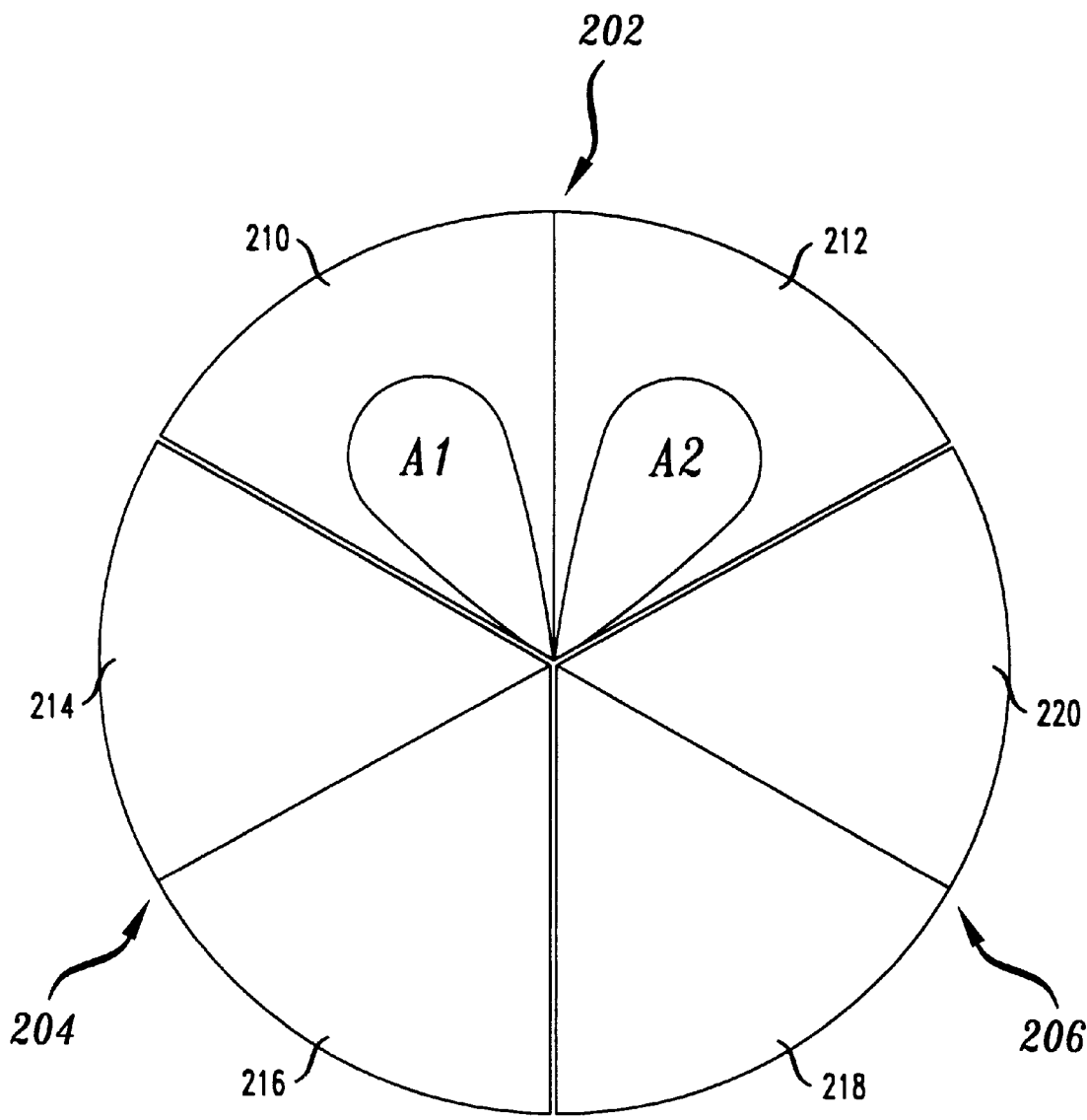
FIG. 2 is a block diagram of a sub-sectored cell of a wireless telecommunication system.

FIG. 2 illustrates one cell 200 of a time slotted system according to an embodiment of the present invention for achieving synchronicity by switching to an optimal antenna prior to start of a time slot. Cell 200 is divided into three 120° sectors 202, 204, 206. Alternatively, cell 200 can be divided into six 60° sectors, or any other convenient integer number of sectors (including only one sector). Each sector 202, 204, 206 is then further subdivided into two sub-sectors 210 and 212, 214 and 216, and 218 and 220, respectively. Subdividing each sector into multiple sub-sectors allows each of the 120° receive antenna that would have been needed to provide coverage for each of the sectors to be replaced with two 60° antennas. Since gain is inversely related to beamwidth of the antenna, the narrower beamwidth antennas provide higher gain. Higher gain receive antennas permit reliable reception of user signals at greater distances, allowing the range, and therefore the size, of cell 200 be greater than the range of a cell that is not sub-sectored. By dividing each sector in half, a possible system gain of up to 3 dB can be achieved.

FIG. 2 shows two antennas 302, 304 each providing coverage to a sub-sector of a cell that comprises one half of a sector. In alternative embodiments, the sub-sectors do not have to be evenly sized, and/or the sector can be divided into more than two sub-sectors, each with its own antenna(s).

Figure 3:
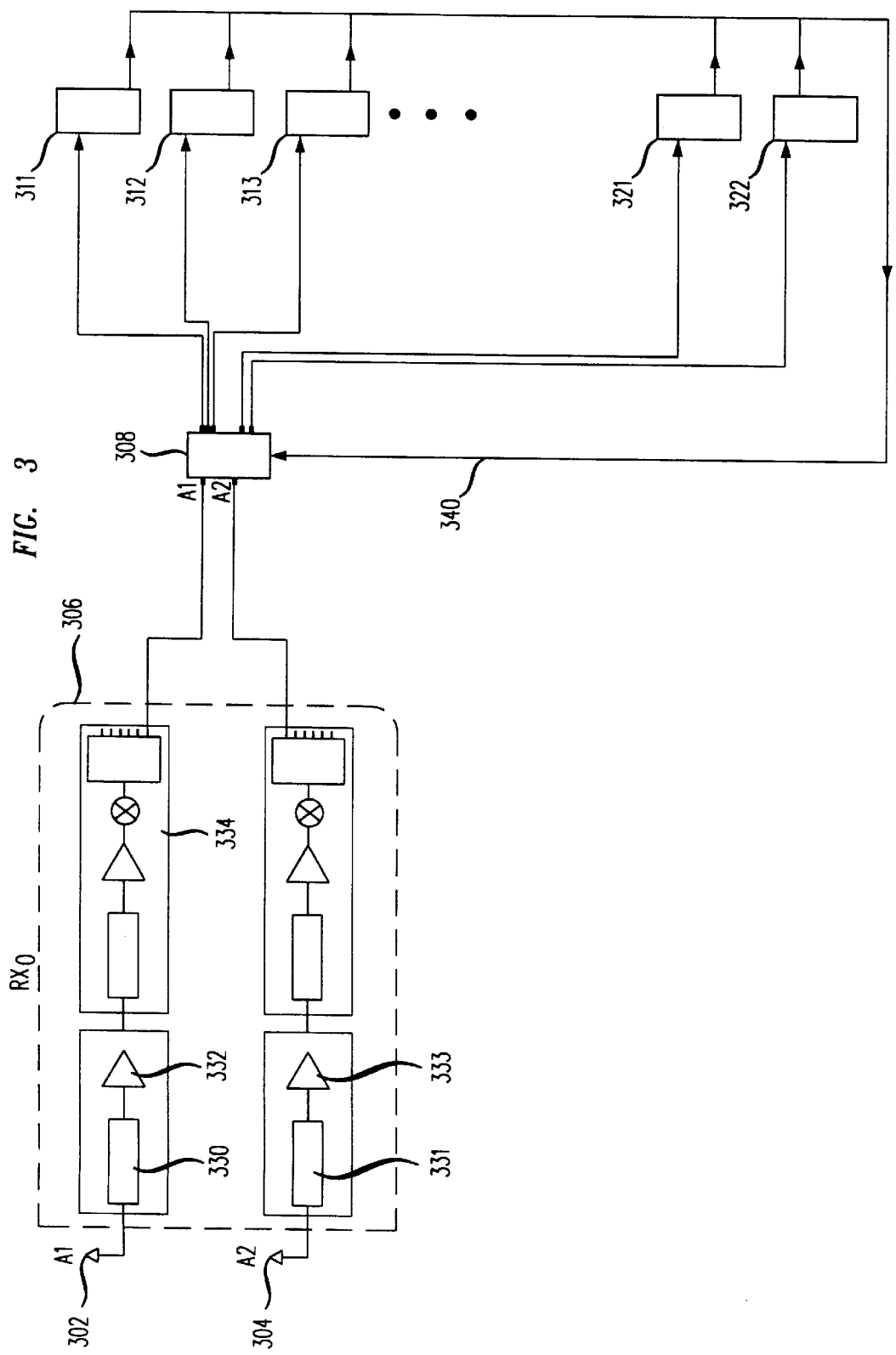
FIG. 3 is a block diagram of a portion of a base station.

FIG. 3 shows a portion of base station 300 for use with sub-sectored cells. Base station 300 includes antennas 302, 304, amplification unit 306, switch unit 308, and radios 311 through 322. Base station 300 also includes other circuitry and antennas, such as a locate radio, transmitter (not shown), and a digital facilities interface (not shown) for communication with the MSC over a transmission line.

The amplification unit 306 has a receive path for each of antennas 302, 304. Each receive path has filter 330, and low noise amplifier (LNA) 332. Optionally, each receive path can also include frame receive unit 334 that steps down the frequency of the received signal. Frame receive unit 334 should be included if radios 311 through 322 are designed for a frequency lower than the frequency of the received signal, such as when the radios are designed for cellular frequencies (e.g. 800 MHz) and the received signal is at the personal communication system (PCS) frequencies (e.g. 1.9 GHz). Each receive path is connected to switching unit 308.

A signal transmitted by a mobile unit is received on one or both of antennas 302, and 304, filtered by filters 330, 331, amplified by LNAs 332, 333 and provided to switching unit 308. Switching unit 308 switches each of the receive paths to each of radios 311 through 322. Switching unit 308 can be any suitable switch such as Lucent Technologies BBM1 RF Switch Divider. Radios 311 through 322 can be any suitable radios, such as Lucent Technologies' Enhanced Digital Radio Unit (EDRU). Each of the radios 311 through 322 tunes to one of the channels assigned to the cell. Each of radios 311 through 322 can be configured for different functions via software control. Typically, one of the radios operates as a locate radio, which receives the signal strength of the mobiles that are on an active channel that is assigned to a neighboring base station to determine whether a mobile's signal strength warrants the mobile to be handed off to the locate radio's cell base station. Additionally, each of the radios can operate as a scanning radio that scans all of the frequencies to determine which antenna to use in a particular time slot for a particular radio. Although, twelve radios are shown, one skilled in the art will appreciate that either more or less than twelve radios can be used.

Figure 4:
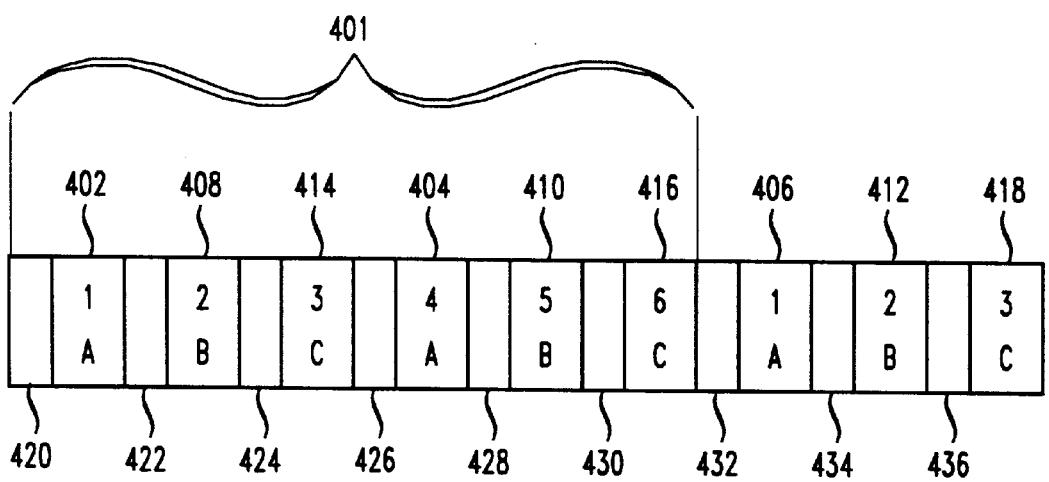
FIG. 4 is a timing diagram illustrating time slots in a typical North American TDMA system.

In a typical time slotted system, such as a TDMA or a GSM system, each of the radios supports multiple calls on each RF channel. Currently, TDMA supports three calls on each channel, and GSM supports eight calls on each channel. FIG. 4 illustrates a timing diagram for one channel of one radio in a TDMA system. Each frame 401 contains six time slots on each channel, with each of the channels having a similar time slot structure. The time slots cycle after every third time slot. A signal from a user is only received during the user's designated cyclical time slots. For example, when there are two user in a sector, signals from user one occupy time slots one 402, 406 and four 404. Signals from user two occupy time slots two 408, 412 and five 410. Time slots three 414, 418 and six 416 remain unused.

The time slots are separated by guard times 420 through 432 and ramp times (not shown). Guard times 420 through 432 are 6 bit, 0.123 ms time periods during which no user data is transmitted or received. The guard times are used to prevent overlapping of received bursts of data received during the time slots. The ramp times are 6 bit, 0.123 ms time periods used to allow the signal to ramp up.

Referring to FIGS. 3 and 4 concurrently, in each time slot each of radios 311 through 322 is provided with the received signals from one of the antennas 302, 304 by switching unit 308. One of radios 311 through 322 operates as a scanning radio that analyzes the signals received on antennas 302, 304 and controls switching unit 308 to connect the antenna receiving the optimal signal for a particular time slot of a particular call, for example time slot 406, to the radio handling that call, for example 311. The scanning radio analyzes each of the signals received on both antennas 302, 304 for a particular time period and determines the optimal signal. The time period can be the previous time slot 404 of the signal, or an average of several previous time slots 402 and 404 of the signal, or even a portion of a previous time slot 404 of the signal. Preferably, the optimal signal is determined based on the received signal's information content, such as bit error rate. However the optimal signal can be determined based on other criteria such as signal amplitude, signal to noise ratio, or signal to noise and interference ratio.

The scanning radio analyzes the received signals prior to the start of time slot 406, and directs switching unit 308 to connect the antenna receiving the optimal signal for time slot 406 to radio 311. Switching unit 308 connect that antenna to radio 311 prior to the start of time slot 406, to synchronize signal. Preferably, switching unit 308 connects the antenna to the radio during the guard time 432 of the time slot 406.

The scanning radio continues to monitor each of antenna 302, 304 during each of the time slots and selects which antenna should be coupled to a radio during a particular time slot as described above, coupling the antenna to the radio during the guard time of the time slot. Switching between antennas 302, 304 during the guard time of a time slot prevents the user from hearing any signal disturbance such as noise that can occur during the switching between antennas 302, 304.

Preferably, the scanning radio function is in one or all of the radios 311 through 322. The radio(s) used for the scanning radio function can be the same radio used as the locate radio of base station 300. When using the locate radio's for the scanning radio function, care should be taken to ensure that it does not interfere with the other functions of the locate radio.

In the preferred embodiment, the scanning radio is one of the radios 311 through 322 and it is dedicated to analyzing the received signals and selecting the optimal antenna(s) based on signal strength, signal quality, the information content of the signal, or any other desirable parameters. For example, when radio 322 is used as the scanning radio, radio 322 sends a signal on control lines 340 to switching unit 308 to couple the optimal antenna for a particular radio during the guard time of a particular time slot. Optionally, the actual radio that functions as the scanning radio can be changed to accommodate the needs and capacity of the system. For example, if radio 322 needs to be serviced or repaired, radio 321 can serve as the scanning radio.

Alternatively, a separate measurement radio can be used for the scanning function, as described in an application filed concurrently herewith and assigned to the same Assignee hereof, U.S. patent application entitled "Measurement Radio System for Producing Operating Information for Traffic Radios" Ser. No. 09/143,667, incorporated herein by this reference. The measurement radio can be used to analyze the received signals, pass the information to each of the other radios, and each of the radios then selects the optimal signal and directs switching unit 308 to couple the antenna receiving the optimal signal for the time slot to itself. The measurement radio can also perform other functions, such as, scan the channels, to determine operating information for the radios, such as AGC settings for the channel to be handed off to a different set of antennas, signal quality, power level, bit error rate (BER), frame error rate (FER), delay spread conditions, speed of mobile and/or other operating characteristics, and to change how the radio services the channel.

In an alternative embodiment, each radio 311 through 322 can contain its own scanning radio function, so that each radio 311 through 322 can monitor and analyze the signal received on antennas 302, 304 for its own calls. Care should be taken so that the scanning radio function does not impair radios' 311 through 322 ability to process the voice signals to ensure that the voice quality for any of its calls is not impaired.

Switching the antenna used for transmission of a signal from the base station to the mobile unit is also preferably performed prior to the start of the time slot during which the signal is transmitted. In one embodiment, the same sub-sector used for reception of the signal for a particular user in a particular time slot is used to transmit the signal to the user in same time slot.

Figure 5:
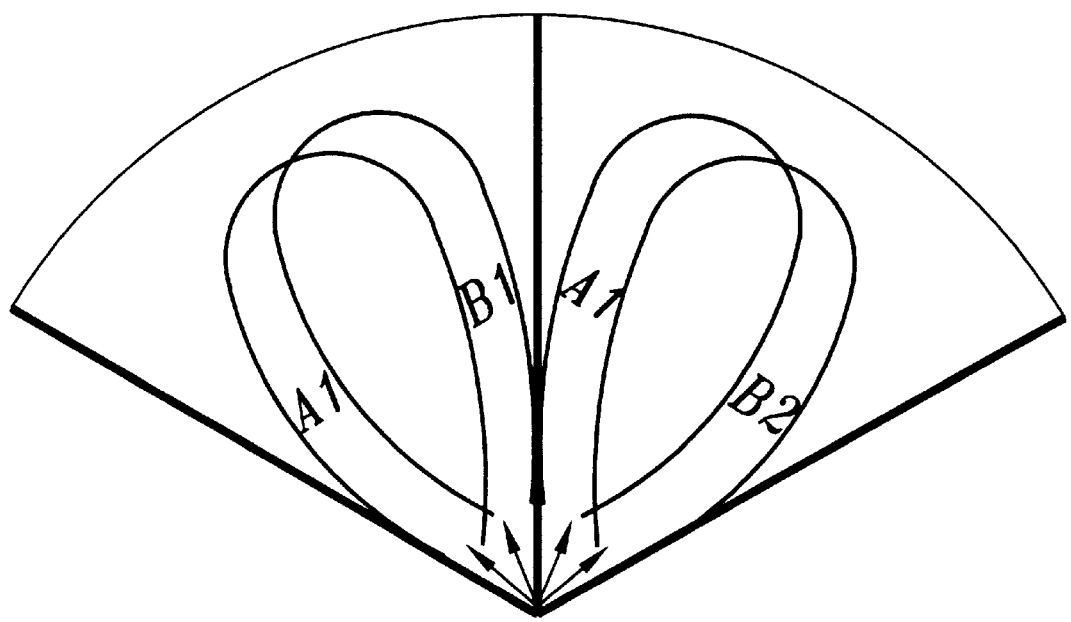
FIG. 5 is a block diagram of the antennas for a sector having two sub-sectors and two branch diversity.
Figure 6:
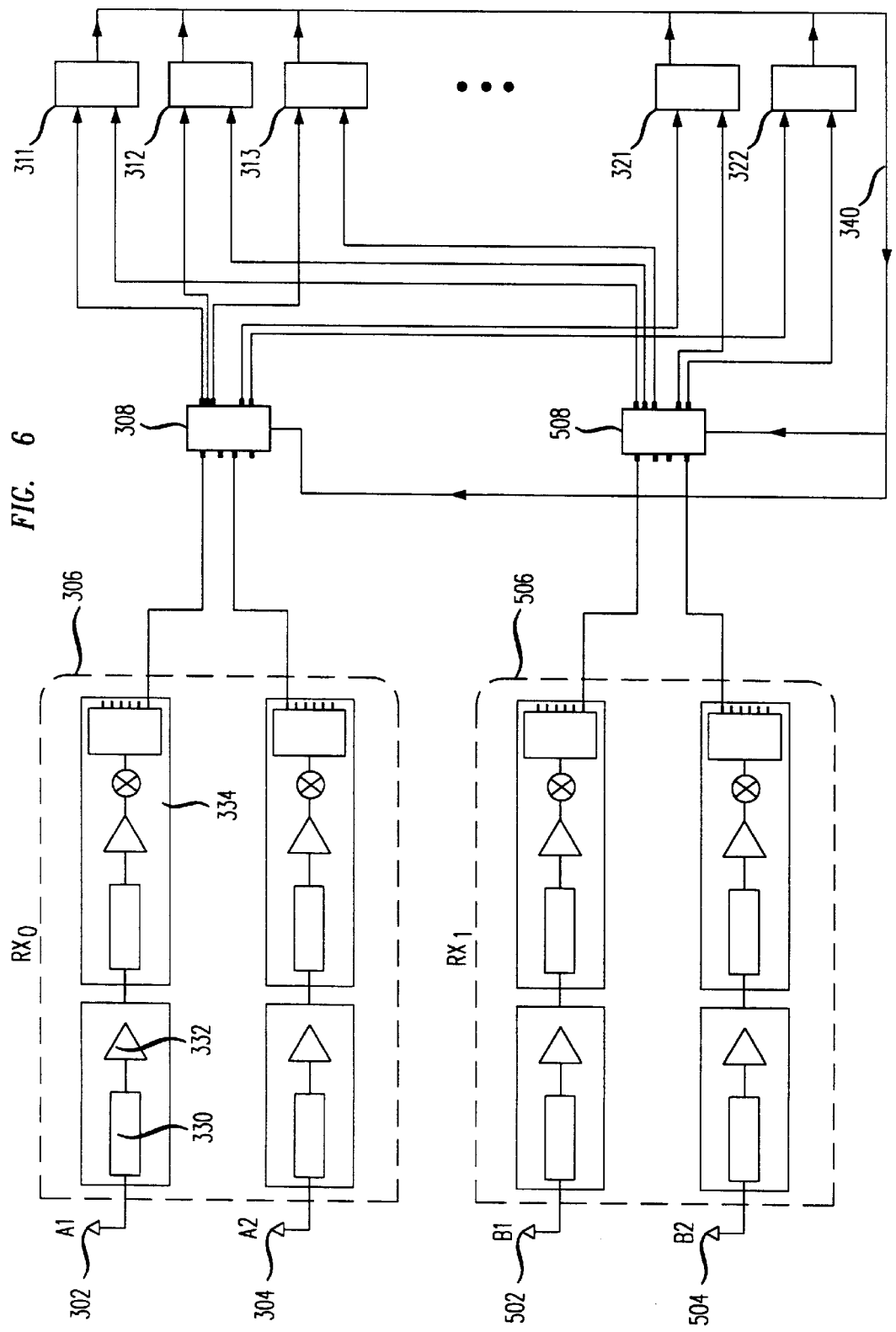
FIG. 6 is a block diagram of a portion of a base station.

Referring to FIGS. 5 and 6, spaced diversity reception will be available by adding a second set of antennas 502, 504. The second set of antennas having antenna diversity with the first set of antennas using spaced diversity or other forms of diversity such as polarization diversity, or angular diversity. In spatial diversity, each one of the antennas in the second set of antennas is laterally spaced from one the antennas 302, 304 in the first set of antennas. Both sets of antennas can be switched through one switching unit, or as shown, each set of antennas 502, 504 and 302, 304 can be switched through a separate switching unit 508, 308 respectively. Spatial separation of antennas is used to achieve diversity and is beneficial to combat fading. Spacing each pair of corresponding diversity antennas about 10 wavelengths apart provides uncorrelated signals that help to eliminate or substantially reduce the effects of fading. The scanning radio may then select an optimal antenna from all of the antennas. Alternatively signal sets can be formed using the signals received on antennas from the first and second set of antenna. The scanning radio can then select the optimal signal set. Preferably, however, the scanning radio selects the optimal antenna from all of the antennas, forms signal sets using the signal from the optimal antenna and signal(s) from the other antennas, and selects the optimal signal set.

Figure 8:
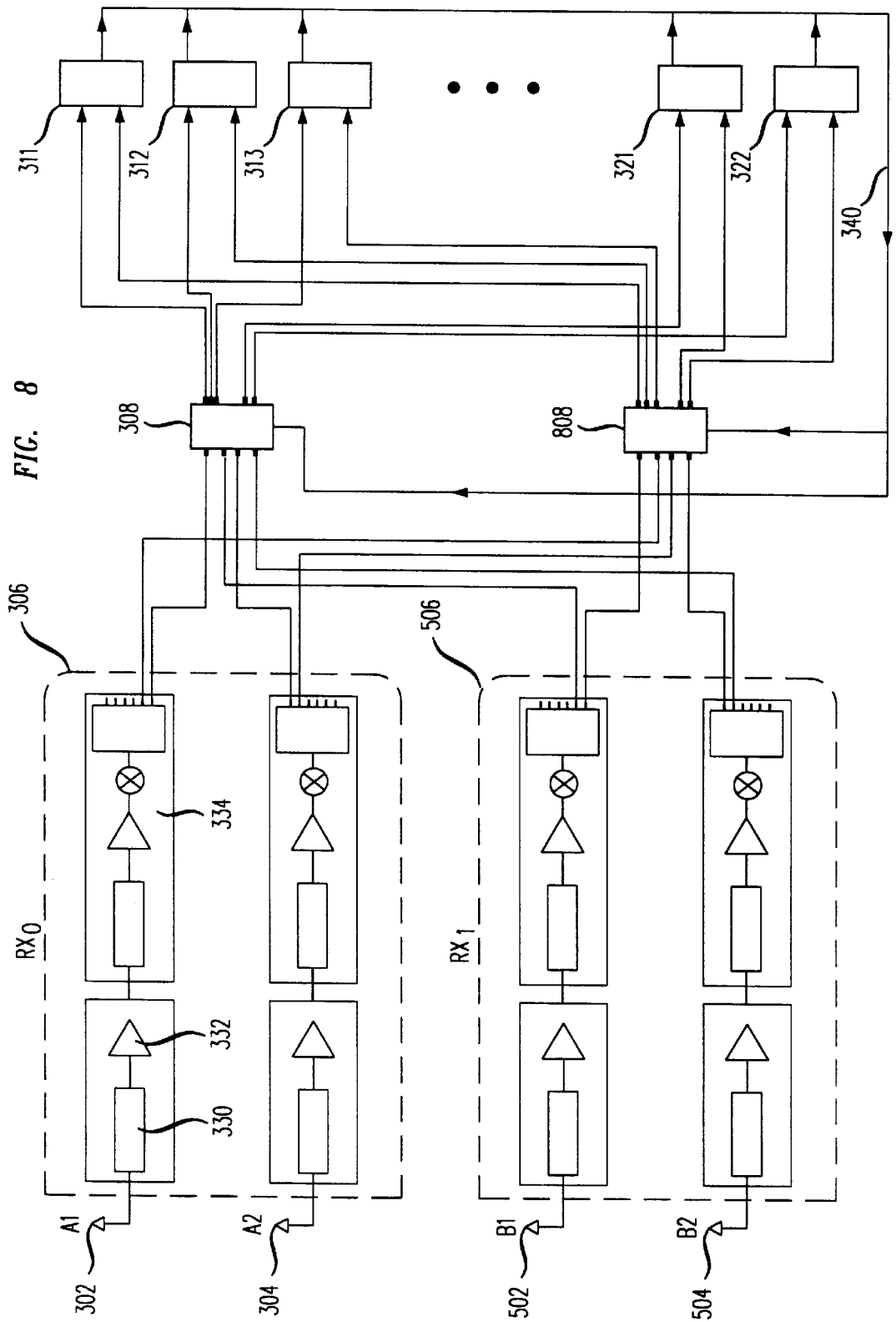
FIG. 8 is a block diagram of a portion of a base station.

Referring to FIG. 8, in the preferred embodiment of the invention, the scanning radio determines the mean signal to noise plus interference ratio for each of antennas 302, 304, 502, 504 over the period of time designated for analyzing the antenna signals. As explained with reference to FIG. 4, this period of time can be one time slot, several time slots, or a portion of a time slot. The antenna with the highest signal to interference ratio is chosen the optimal antenna, for example antenna 304. The optimal antenna is paired then with each of the other antennas for analysis, creating antenna pairs 304 and 302, 304 and 502, and 304 and 504. Scanning radio 336 then calculates the cross correlation coefficient of the signal to noise plus interference ratio for each of the antenna pairs. The cross correlation coefficient is a measure of the independence of fading for each particular pairs of antennas. The scanning radio also calculates the ratio of the mean signal levels between the optimal antenna and the other antenna of the pair:

$$\frac{\text{mean signal}/(\text{noise} + \text{interference}) \text{ for optimal antenna}}{\text{mean signal}/(\text{noise} + \text{interference}) \text{ for other antenna}} \quad (1)$$

This is performed for each of the antenna pairs. The diversity gain of each antenna pair can then be compared. The antenna pair with the highest overall diversity gain is chosen to provide the optimal signal set.

Figure 7:
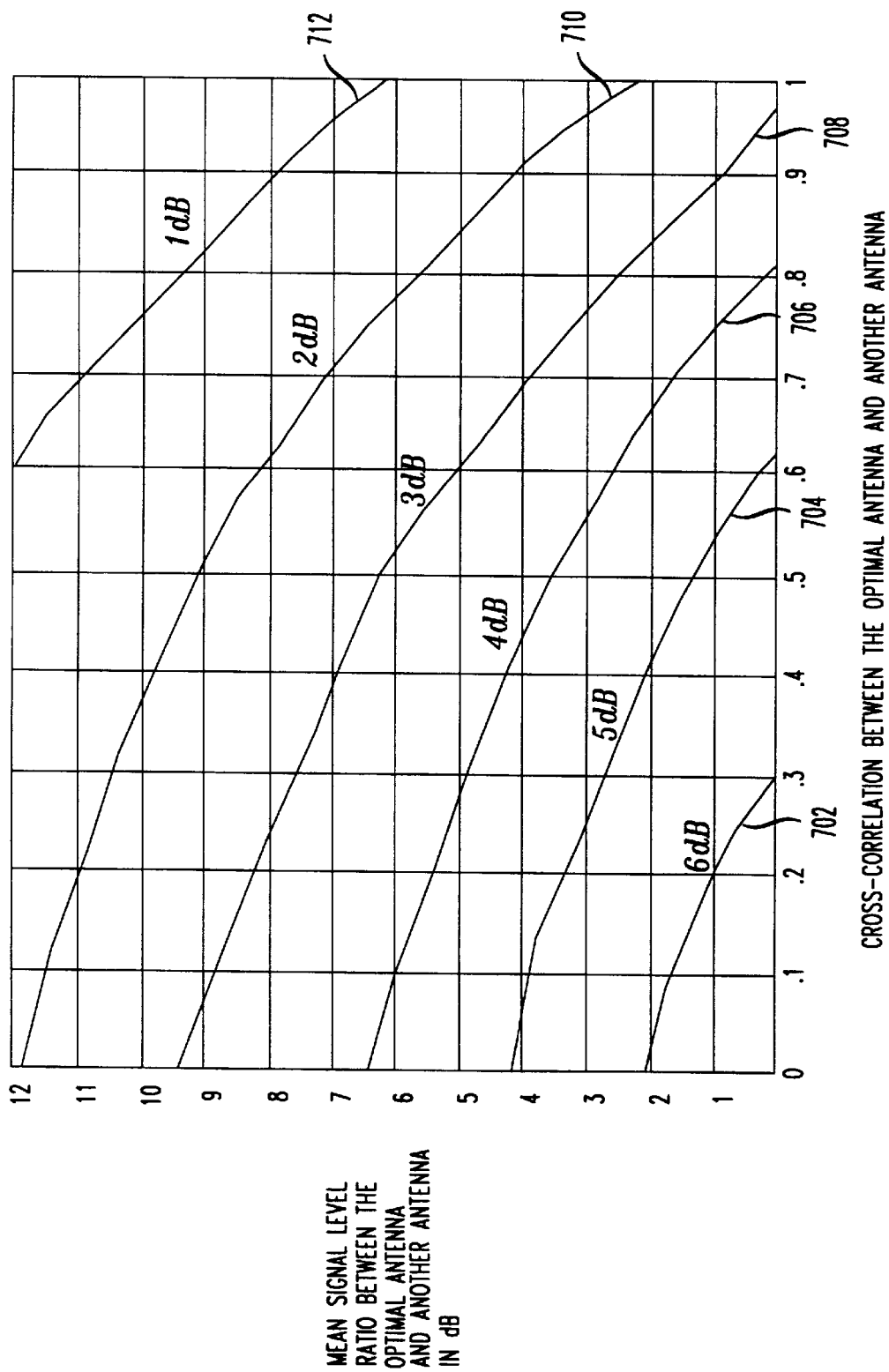
FIG. 7 is a graph of the effective diversity gain of a two branch receiver system as a function of the cross correlation coefficient of the signal-to-noise plus interference ratio and the mean signal level ratio between the two diversity branches.

FIG. 7 illustrates a graph of the effective diversity gain for a two branch system as a function of the cross correlation coefficient of the optimal antenna and another antenna and the mean signal level ratio of the optimal antenna and the other antenna in the pair. The diversity gain contours of a two-branch maximum ratio combining diversity system are plotted as gain thresholds 702, 704, 706, 708, 710, 712. One way of obtaining the best pair of antennas is by determining where each antenna pair fits on this graph. Using the antenna pair's cross correlation coefficient, and the antenna pair's mean signal level ratio locates the performance on the graph. For example, if an antenna pair's cross correlation coefficient is 0.8, and the antenna pair's mean signal level ratio is 3 dB, the diversity gain of the antenna pair is between 2 dB and 3 dB. By comparing every possible pair of antennas that includes the optimal antenna, the best pair of signals is chosen in such a fashion as to avoid choosing two strong signals that are also highly correlated. Instead, this algorithm optimizes signal strength and decorrelation.

FIG. 8 shows a two branch diversity base station 800 that includes first set of antennas 302, 304 and second set of antennas 502, 504. Base station 800 also includes second switching unit 808 to permit the switching of each of the received signals to the scanning radio so that the scanning radio can receive the optimal signal from one antenna and the signals from each of the other antennas concurrently. The chosen receive paths are switched through each switching unit 308 and 808 to provide two signals to the scanning radio concurrently.

Figure 9:
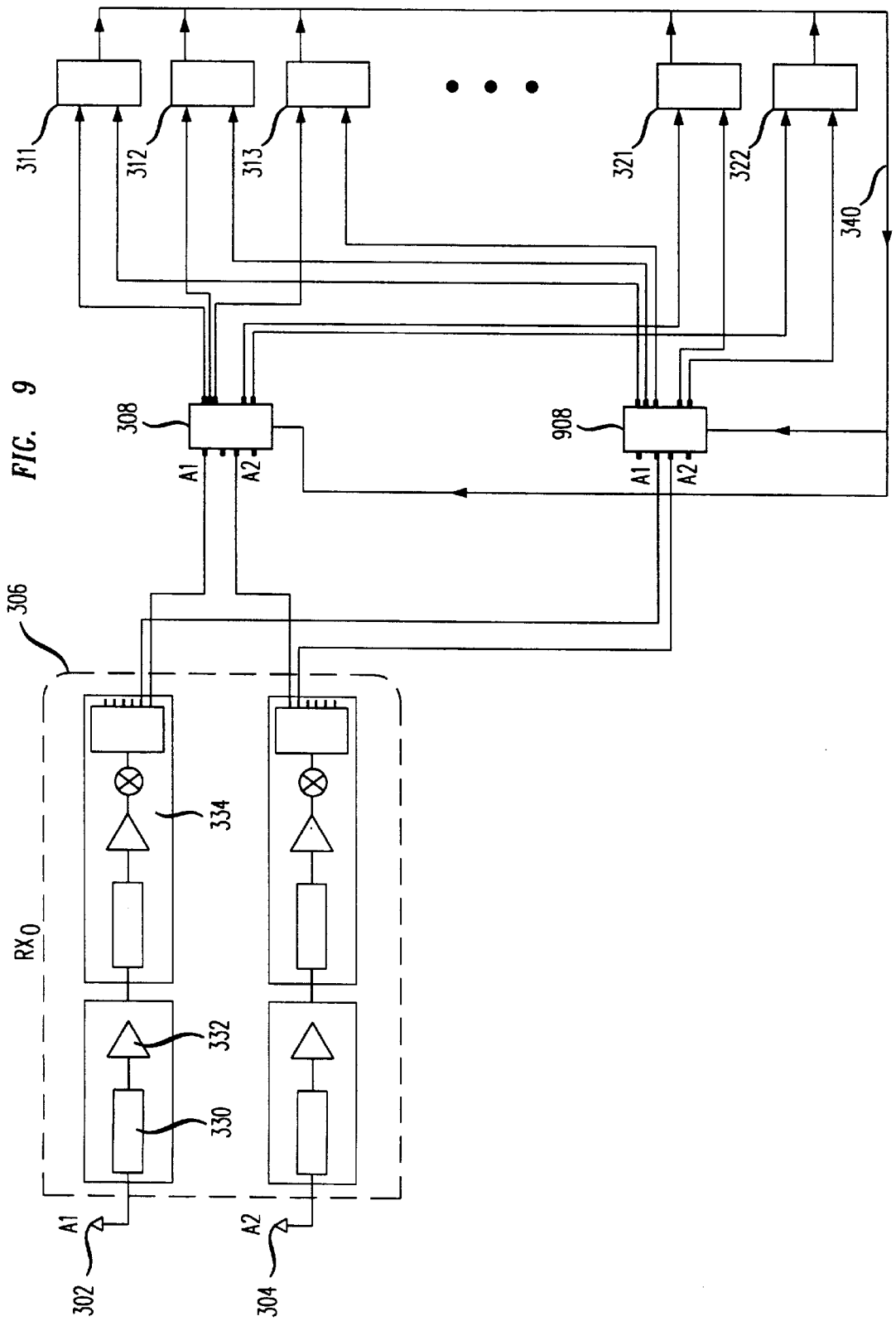
FIG. 9 is a block diagram of a portion of a base station.

Selecting the optimal antenna from all of the antennas, then forming sets of signals from the optimal antenna with each of the other antennas to obtain a plurality of signal sets and selecting the optimal signal set can also be implemented for an antenna system where other types of diversity is used. As shown in FIG. 9, second switching unit 908 is added for switching each of the received signals so that the scanning radio can receive the optimal signal from one antenna and the signals from each of the other antenna concurrently. The receive paths from both sets of antennas 502, 504 and 302, 304 are switched through each switching unit 308 and 908 to provide two signals to the scanning radio concurrently.

Although the system has been shown with two branch diversity, one skilled in the art will appreciate that the system can be implemented with N way diversity, where N can be any integer number.

While the invention has been described with reference to a preferred embodiment, it will be understood by those skilled in the art having reference to the specification and drawings that various modifications may be made and various alternatives are possible therein without departing from the spirit and scope of the invention.

We claim:

1. A method of selecting the optimal signal in a time slotted communication system, wherein the communication system includes a receiver system and the time slots include guard times, the method comprising:

receiving a plurality of signals on a plurality of first antenna elements in one or more time slots;

receiving a plurality of signals on a plurality of second antenna elements having antenna diversity with one corresponding antenna element of the plurality of first antenna elements; obtaining a plurality of a signal sets, each signal set obtained from at least one of the signals received on one of the first antenna elements and at least one of the signals received on one of the second antenna element;

determining an optimal signal of the signal sets; and switching the antenna elements receiving the optimal signal of the signal sets to the receiver system during the guard time of a future time slot.

2. The method of claim 1, wherein the step of obtaining the optimal signal includes:

(a) forming signal sets from the signal received on one of the first antenna elements and the signal received on one of the second antenna elements; and repeating step (a) until each of the signal received on one of the first antenna elements is in a set with the signals received on each one of the second antenna elements.

3. The method of claim 1, wherein the step of obtaining the optimal signal includes forming signal sets from the signal received on one of the first antenna elements and a signal received on the corresponding one of the second antenna elements.

4. A method of selecting the optimal signal in a communication system, wherein the communication system includes a receiver system, the method comprising:

receiving a plurality of signal on a plurality of antenna elements;

determining an optimal antenna element;

forming a plurality of signal sets, each set obtained from a signal received on the optimal antenna element and a signal received at least one of the other antenna elements;

determining an optimal signal set from the signal sets; and coupling the antenna elements receiving the optimal signal set from the signal sets to the receiver system.

5. The method of claim 4, wherein the step of obtaining a plurality of signal sets comprises:

(a) forming a signal set from the signal received on the optimal antenna element and the signal received on at least one of other antenna elements; and repeating step (a) until the signal received on the optimal antenna element is in at least one signal set with the signals received on each one of the other antenna elements.

6. The method of claim 4, wherein each set comprises the optimal antenna element and one other antenna element.

7. The method of claim 4, wherein the step of determining the optimal antenna element comprises comparing each of the signal received on each of the antenna elements to obtain the signals having the strongest signal strength.

8. The method of claim 4, wherein the step of determining the optimal antenna element comprises comparing each of the signal received on each of the antenna elements to obtain the signals having the largest signal to noise plus interference ratio.

9. The method of claim 4, wherein the step of determining an optimal signal set of the signal sets comprises the determining an optimal signal of the signal sets based on the information content of the signal in the signal sets.

10. A method of selecting the optimal signal in a communication system, wherein the communication system includes a receiver system, the method comprising:

receiving a plurality of signals on a plurality of first antenna elements;

receiving a plurality of signals on a plurality of second antenna elements having antenna diversity with one corresponding antenna element of the plurality of first antenna elements;

obtaining a plurality of a signal sets, each signal set obtained from at least one of the signals received on one of the first antenna elements and at least one of the signals received on one of the second antenna element;

determining an optimal signal of the signal sets; and coupling the antenna elements receiving the optimal signal from the signal sets to the receiver system.

11. The method of claim 10, wherein the step of obtaining a plurality of signal sets comprises:

(a) forming a signal set from the signal received on at least one of the first antenna elements and a signal received on at least one of the second antenna element; and repeating step (a) until each signal received one of the first antenna elements is in at least one signal set with each of the signals received on one of the second antenna elements.

12. The method of claim 10, wherein the step of obtaining a plurality of signal sets comprises:

forming signal sets from the signal received on one of the first antenna elements and the signal received on the corresponding one of the second antenna elements.

13. The method of claim 10, wherein the step of determining an optimal signal of the signal sets comprises the determining an optimal signal of the signal sets based on the information content of the signals.

* * * * *